340-870.11 SR

XR 2,956,271

(3)

Oct. 11, 1960 E. A. KELLER 2,956,271

LOW LEVEL SCANNER AND ANALOG TO DIGITAL CONVERTER

Filed May 6, 1957 6 Sheets-Sheet 1 de 340/347

INVENTOR.
Ernest Keller
BY
Wallenstein & Spangenberg
attys.

INVENTOR.
Ernest Keller
BY
Wallenstein & Spangenberg
Attys

INVENTOR.
Ernest Keller
BY
Wallenstein & Spangenberg
attys.

Oct. 11, 1960 E. A. KELLER 2,956,271

LOW LEVEL SCANNER AND ANALOG TO DIGITAL CONVERTER

Filed May 6, 1957 6 Sheets-Sheet 4

INVENTOR.
Ernest Keller
BY
Wallenstein & Spangenberg
attys

Oct. 11, 1960 E. A. KELLER 2,956,271

LOW LEVEL SCANNER AND ANALOG TO DIGITAL CONVERTER

Filed May 6, 1957 6 Sheets-Sheet 5

INVENTOR.
Ernest Keller
BY
Wallenstein & Spangenberg
atty.

LOW LEVEL SCANNER AND ANALOG TO DIGITAL CONVERTER

Filed May 6, 1957 6 Sheets-Sheet 6

INVENTOR.
Ernest Keller
BY
Wallenstein & Spangenberg
Attys.

2,956,271

LOW LEVEL SCANNER AND ANALOG TO DIGITAL CONVERTER

Ernest A. Keller, Wilmette, Ill., assignor, by mesne assignments, to Information Systems, Inc., Skokie, Ill., a corporation of Illinois Filed May 6, 1957, Ser. No. 657,265

13 Claims. (Cl. 340—347)

This invention relates to data information systems, and particularly, although not necessarily, to a system which receives analog voltage signals from low level transducers, such as thermocouples, associated with variables to be monitored and then converts the analog signals to coded, preferably binary coded, signals which are stored for further handling.

In data handling systems of the type above defined, the conventional approach has been to scan sequentially the outputs of the transducers, usually by a mechanical switching system and sometimes perhaps by an electronic switching system, which sequentially conects the transducer outputs to various measuring devices which convert the analog signals to binary coded signals which are stored or immediately fed to suitable recording apparatus, such as electric typewriters, where the actual values of the variables are printed out on a record sheet. The measuring devices usually included either a motor driven self-balancing potentiometer system with a mechanical shaft-driven analog to digital converter, or a primarily electrical measuring or electronic circuit which performed an analog to digital conversion electrically from the transducer signals. The output of the analog to digital converter was sometimes already in binary coded form and in other instances had to be converted to a binary coded form by suitable coding networks. The resultant binary signal was then stored in suitable storage means forming a completely separate and distinct part of the system.

The above-mentioned prior systems left a great many things to be desired. For example, since a common measuring device was sequentially connected to the outputs of the transducers, the problem of impedance mismatch of the transducer circuits was present where the transducers were not all alike. Also, where the transducers are low-level signals such as is commonly found in thermocouples, the signals in passing through mechanical scanning switches picked up spurious noise signals caused by arcing, switching transients and the like which affected the degree of accuracy and speed attainable. Also, the reliability and service life of the equipment was limited due to the wearing of contact surfaces, and the equipment required special air-tight housings when used in explosive atmospheres due to contact sparking. With electronic switching systems, noise pick-up was also a problem, although to a lesser degree, as was the fact that the electronic switching systems could not operate directly with the low level signals but required initial amplification with separate D.C. amplifiers for each thermocouple output which added to the cost and complexity of the system.

Limitations on scanning speed become exceedingly important where a large number of variables are to be monitored and almost constant monitoring of all variables is desirable.

Other important disadvantages of the above-mentioned prior systems are in the great over-all size and weight of the equipment, the expense and complexity of the components thereof, and the problems of servicing the equipment. The question of size and weight becomes exceedingly critical where the equipment is to be carried in aircraft or where strict floor space limitations exist in the factory or plant where the equipment is to be located.

The present invention has many aspects, some of which overcome only some of the above-mentioned disadvantages and others of which overcome many and sometimes all of the above-mentioned disadvantages. Among the objects of the present invention, therefore, are: to provide a data handling system wherein particularly low level signals may be handled, converted to binary coded form and stored without the need for mechanical or electronic switching of analog signals; where substantially increased accuracy and reliability are obtained because the measuring part of the system does not have or is not sensitive to the switching noises found in the mechanical and electronic scanning systems heretofore utilized; to provide such a system which can operate at greatly increased scanning rates because the speed of operation is not limited by decay rates of switching transients; to provide such a system which is substantially lighter in weight and occupies only a small fraction of the space required by such prior equipment; to provide such a system which can be used in explosive atmospheres because contact sparking is avoided; to provide such a system wherein the components are rugged, simple and reliable in operation so the equipment can last almost indefinitely and will operate substantially without failure; and to provide a system which, for a given cost, is faster operating, more accurate and reliable than prior systems.

In accordance with one aspect of the invention, the analog voltage outputs of the primary measuring devices or transducers, instead of being passed through a scanning switch, are fed to the inputs of separate comparator circuits. The comparator circuits form an element in an analog to digital converter where the outputs of the transducer are, in a sense to be explained, scanned without varying the D.C. load impedance of the transducer circuits, as would be the case where the transducer outputs are fed through switch contacts or electronic gate circuits. The scanning means includes a source of a progressively varying amplitude signal which is fed to each comparator circuit. Most preferably, the reference signal amplitude varies in very small discrete steps, the sizes of the steps being determined by the range of accuracy desired and the comparator characteristics. For example, the reference signal may have a stepped waveform wherein each step represents a variation in the thermocouple output corresponding to one unit change in the associated variables or wherein each such step produces the same effect in the comparator circuit as a unit change in the temperature variable. The comparator circuits are each adapted to generate a control pulse or signal anytime there is correspondence between the reference signal and the transducer output fed thereto. The output pulses of the comparator circuits thereby appear in time sequence unrelated to the position of connection of the transducer outputs but rather correlated to the analog values of the transducer signals associated therewith. A coding means provides a progressively varying binary code synchronized with the change of the steps in the reference signal source. As a comparator circuit generates an output pulse, a signal is stored in a corresponding storage position of a suitable storage unit which is correlated to and indicates the coded signal produced by the coding means at the instant the pulse in question was generated. A similar signal is simultaneously stored in a corresponding storage position for all transducers producing a comparator circuit output pulse at the same instant.

The comparator circuits each preferably comprise a magnetic core having a rectangular hysteresis curve, two input windings for respectively receiving the transducer signal and the output of said reference signal source and an output winding in which a pulse is generated by the core whenever the magnetomotive forces produced by the two inputs are substantially equal and opposite in direction. Normally, the core is in a reference state of saturation which is maintained by the current in the input winding connected to the associated transducer. The current signal in the input winding connected to the reference signal source progressively increases in a direction which opposes the effect of the transducer current in the other input winding. When the results of these two currents are the same, the next level of the reference signal drives the core to the opposite state of saturation, thereby inducing a control pulse of appreciable magnitude in the output winding.

Preferably, the initiation of the various steps of the reference signal source is synchronized directly or indirectly from a source of timing pulses. The source of pulses either control or are controlled by the coding means. Preferably, the coding means comprises a pulse counter, a scale-of-two counter, which has a number of output lines corresponding to the number of binary code bits in a code group, the binary decimal coded groups in effect identifying the particular level of the output of the reference voltage source. However, in the broader aspect of the invention, other types of coding means could be provided. The various stages of the scale-of-two counter are bistable units which control the current or voltage generated by the reference signal source. Each stage controls preferably the conduction of one of a number of current paths having individual load resistors and connected in parallel with each other and in series with a relatively low load resistance connected in common to all of the current paths. If the combined parallel resistances of said current paths is substantially larger than said common load resistance and the resistance therein are related by a power of two in inverse relationship to the order of the associated scale-of-two pulse counter stage, then the current flow through said common load resistor will increase in identical discrete steps if conduction and non-conduction of the current paths correspond with the instantaneous bistable state of the associated stages.

The above-mentioned storage unit is arranged so that it can theoretically receive information from the signal sources in all storage positions thereof substantially simultaneously since the instants of entry of information therein within a scanning cycle is solely a function of the values of the associated variables. In the most preferred form of the invention, the storage unit includes a magnetic core matrix which may itself be of more or less conventional construction but which is utilized in a novel manner to accomplish the results desired by the invention. Conventional magnetic core matrices have a number of rows of magnetic cores. In the present invention, the cores in each row represent different bits of a multi-bit binary code group which is to represent the value of the associated variable and each such row corresponds to one of said storage positions. The cores are preferably of the type having a rectangular hysteresis curve, a saturated state of magnetization beyond one knee of the curve representing one binary character and a saturated state of magnetization beyond the other knee of the curve representing the other binary code state. Each of the cores has a first input winding which is in series or parallel with each of the other windings in the same row. Considering the corresponding cores in each row as falling within a given column, each of the cores has a second input winding which is connected in series or parallel with the corresponding winding of each of the other cores in the same column. Each of the cores includes preferably a third output winding which is in series with the output winding of each of the other cores.

In accordance with the invention, the outputs of the various comparator circuits, which in the preferred form of the invention are output windings of magnetic core units, are each connected to the first input windings of the cores in the corresponding or associated row of cores. In the case where the coding means is a pulse counter, each of the output binary code bit lines of the counter are connected to the second input windings of the corresponding column of the core matrix. The windings of the cores are designed so that the cores will be driven from a given reference state of magnetization to the opposite state of magnetization when the input windings thereof both have signals of a given polarity occurring simultaneously. With the particular connection of the magnetic core matrix to the coding means and the amplitude comparator circuits above outlined, the magnetic cores of the respective rows of the matrix will have magnetic states corresponding to the binary codes which represent the values of the associated variables, the sequence of the signal entries in these rows being determined solely by the values and not the order of connection of the variables to their transducers.

Following the completion of an amplitude scanning cycle of the reference voltage source, the coded signals stored in the magnetic core matrix can be read out sequentially to other suitable storage means, such as a magnetic drum, or directly to an output recording device such as an electric typewriter. The code groups may be read out by pulsing sequentially the row and column input lines of the matrix with a signal which will drive the cores set to said opposite state of magnetization back to said reference state of magnetization. The change of magnetic state in any core will induce an output pulse in the output winding of the core.

In order to decrease the scanning period so that it is not necessary to await the sequential readout of the information stored in the code storage means before beginning a new scanning cycle, a pair of said code storage units are provided so that while information on certain variables is being read out from one of the storage units, fresh binary coded information on the same or other variables is taking place in the other storage unit. Since storage and readout operations are occurring simultaneously, scanning is continuous.

It can thus be seen that the above-mentioned form of the invention alleviates the various disadvantages above described. In the first place, the thermocouple outputs are not switched in the normal sense through mechanical or electronic switches and the invention avoids the undesirable contact sparking, noise pickup and mismatching of the transducer load impedances. Moreover, the scanning rate is not limited by switching transients and the like, permitting a much higher scanning rate than was heretofore possible. Greater accuracy, speed and reliability thus result from the arrangement of the present invention. In the second place, the number of components is drastically reduced, particularly in the preferred form of the invention above described. The magnetic cores constituting the comparison portion of the anolog to digital converter performs both comparison and amplifying functions, the amplifying function being the generation of a current or voltage pulse indicating the presence of a given state of comparison between the reference voltage and the transducer output. Amplitude comparison circuits of a type heretofore utilized (for completely different purposes than in the present invention) have operated on a principle which resulted in a generation of a signal which was a function of the magnitude and direction of the difference between the two signals being compared, and this signal in turn was amplified by a separate amplifier or pulse shaping circuit. In the present preferred form of the invention, this is accomplished within the comparison unit itself, namely a magnetic core unit forming the comparison circuit. Moreover, in the preferred form of the invention, the magnetic core storage means both aids in the conversion operation and acts as a buffer storage for the coded signals. The use of magnetic cores for scanning conversion and storage in the manner above explained greatly minimizes the size and weight of the equipment and increases the reliability and longevity of the equipment relative to the kind of equipment heretofore used in variable measuring and recording equipment.

Other objects, advantages and features of the invention will become apparent upon making reference to the specification to follow, the claims and the drawings wherein:

Fig. 1 is a basic box diagram showing the over-all arrangement of components in the present invention;

Figs. 2*a* and 2*b* together show the most preferred form of the invention wherein the comparison circuits and the storage units are made of magnetic cores;

Figure 2A:
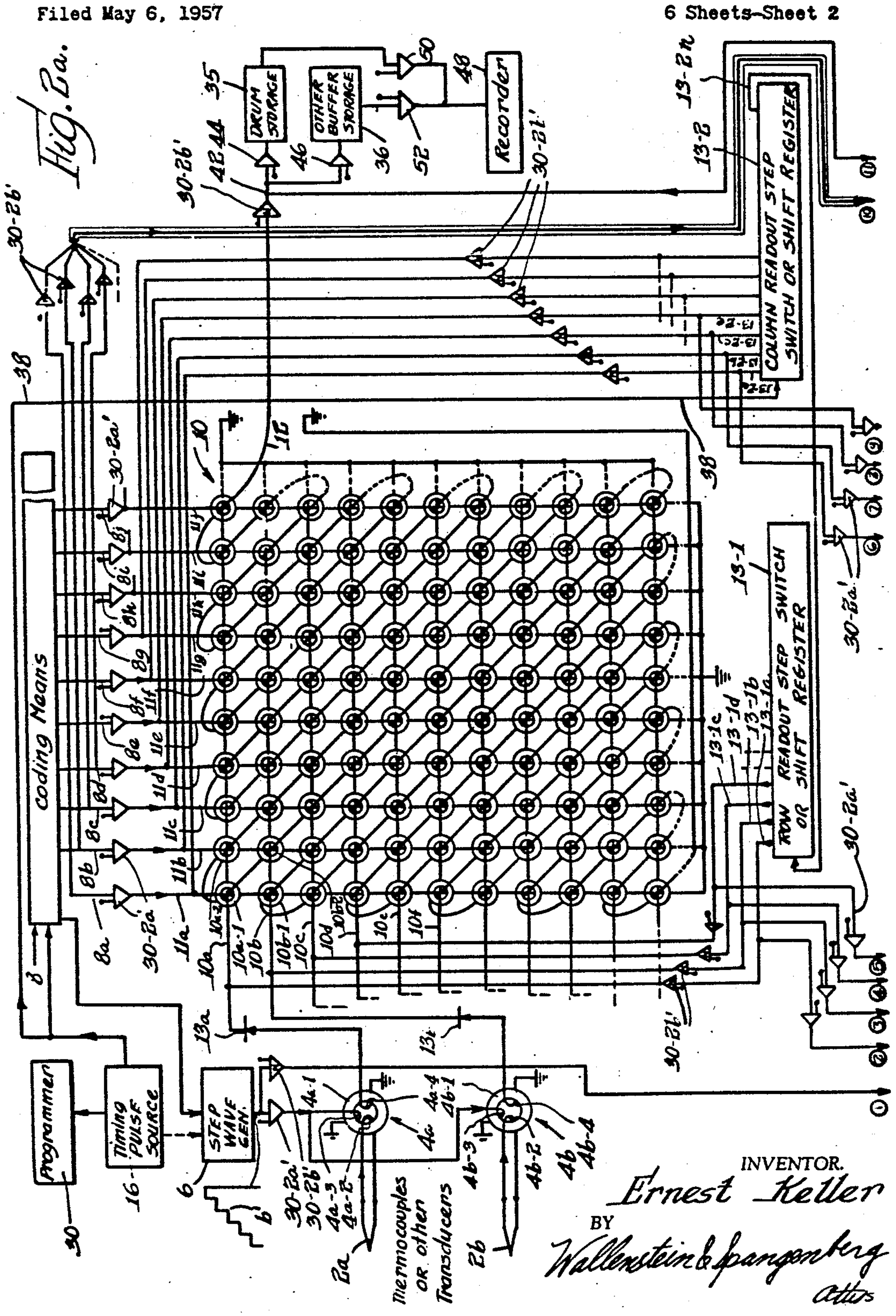
Figure 2B:
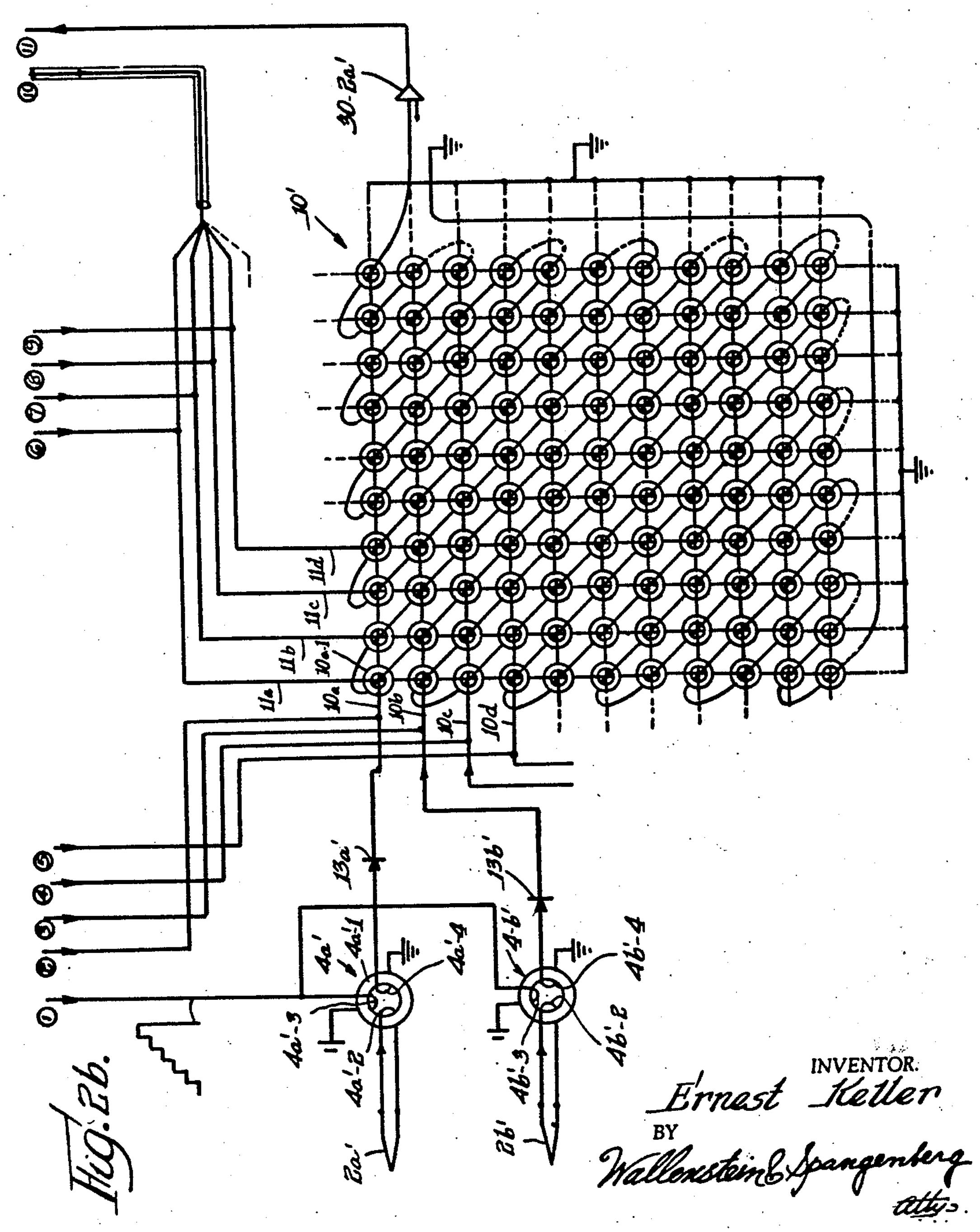
Figures 5, 7:
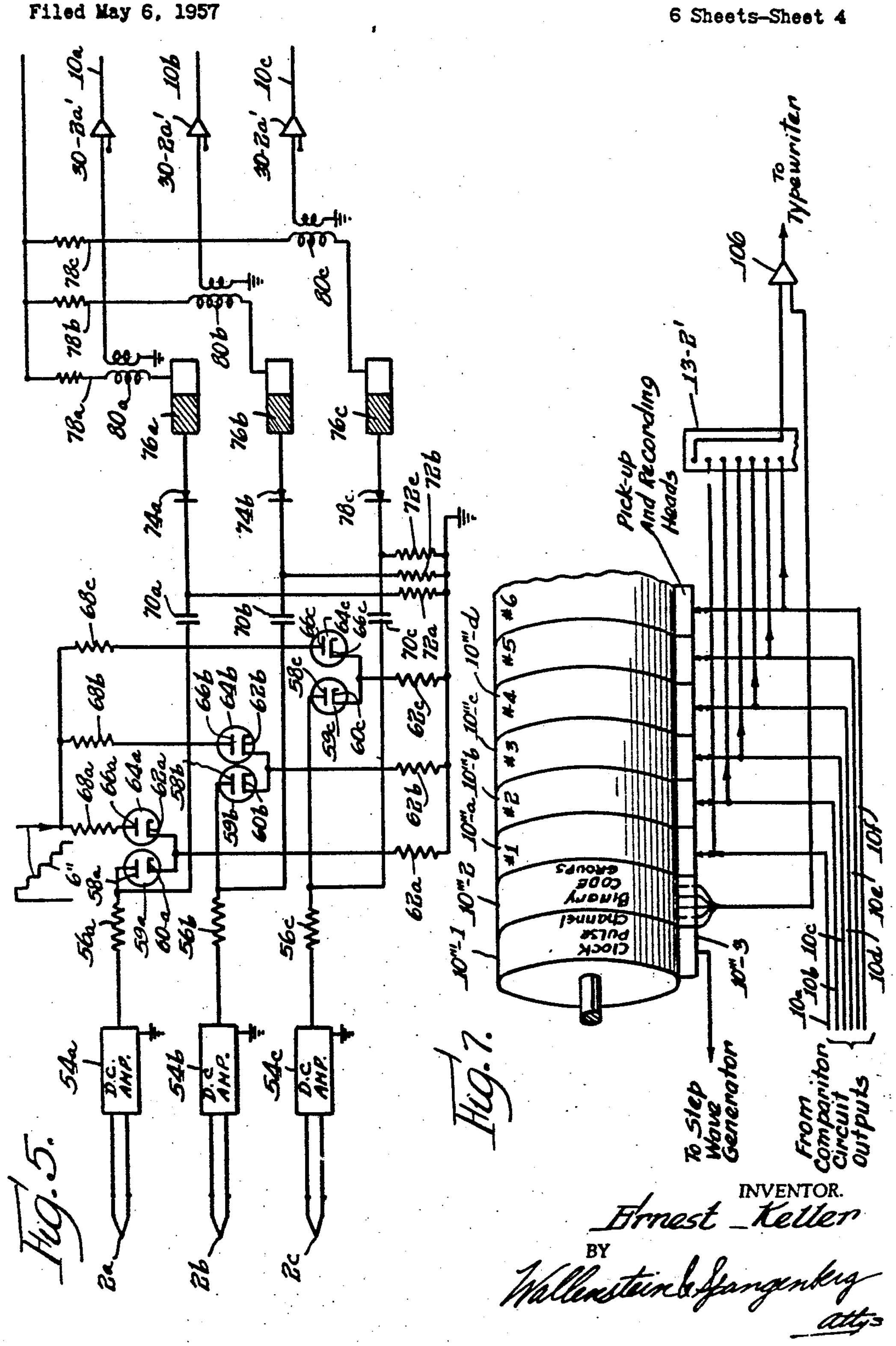
Fig. 5 shows a modified form of comparator circuit which, in the broadest aspects of the invention, may be utilized instead of the most preferred form of comparator circuit shown in Figs. 2*a* and 2*b*.
Figure 6A:
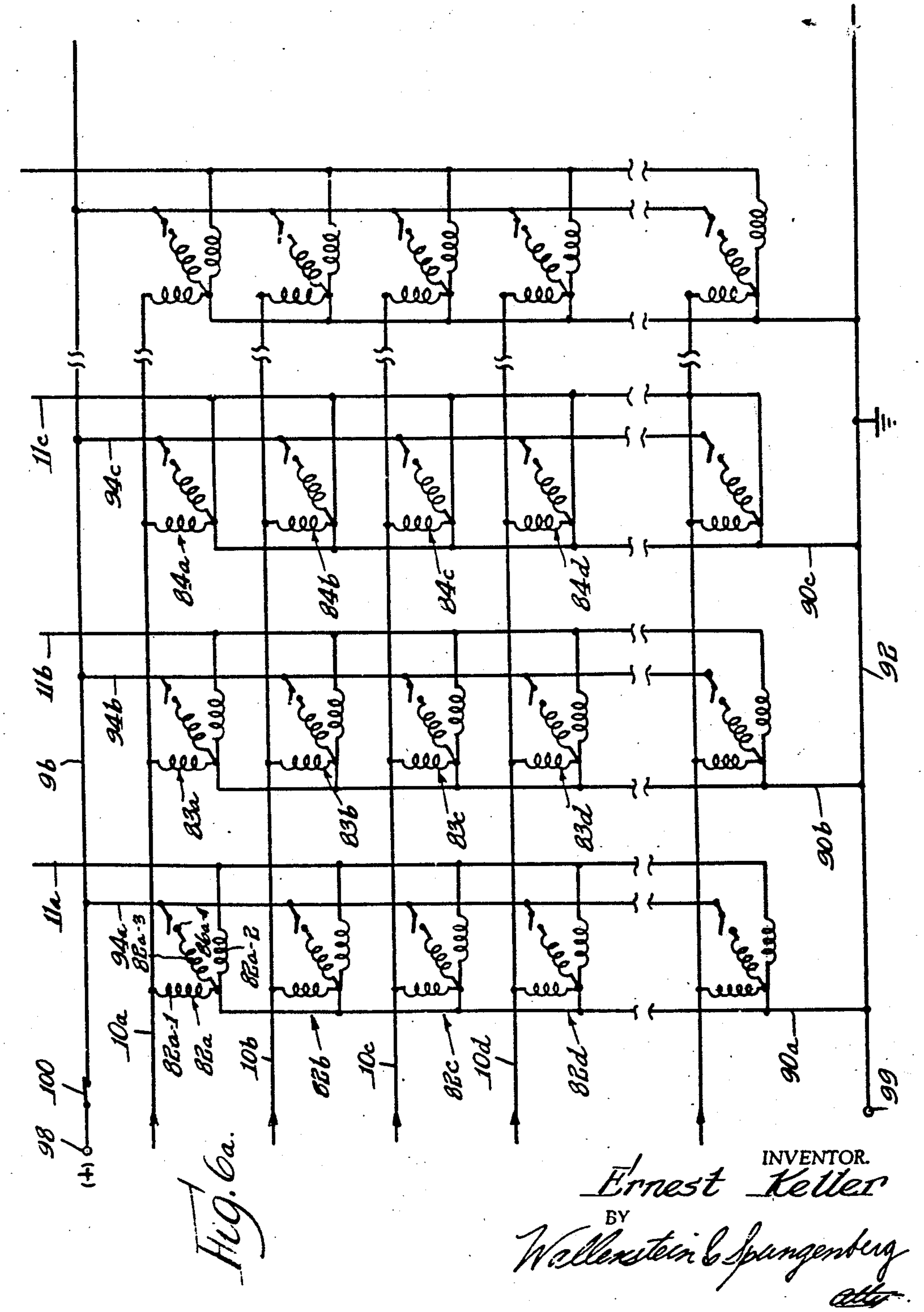
Figure 6B:
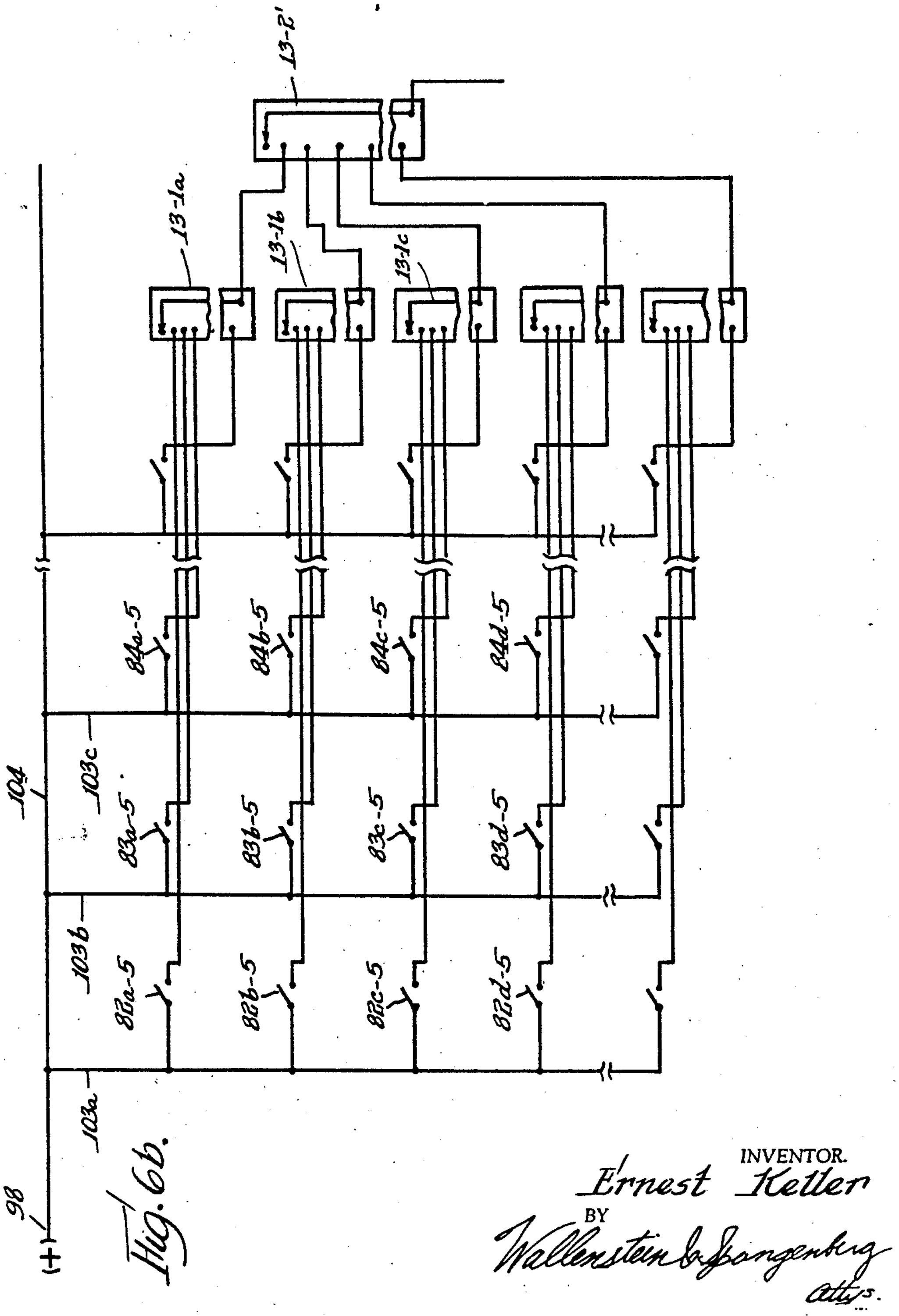

Figs. 6*a* and 6*b* show a relay storage matrix which, in the broader aspects of the invention, may be utilized instead of the magnetic core matrix shown in Figs. 2*a* and 2*b*; and Fig. 7 shows a still further modification of the invention utilizing a magnetic drum in place of the magnetic core or relay storage matrix of the more preferred forms of the invention.

Figures 1, 3, 4:
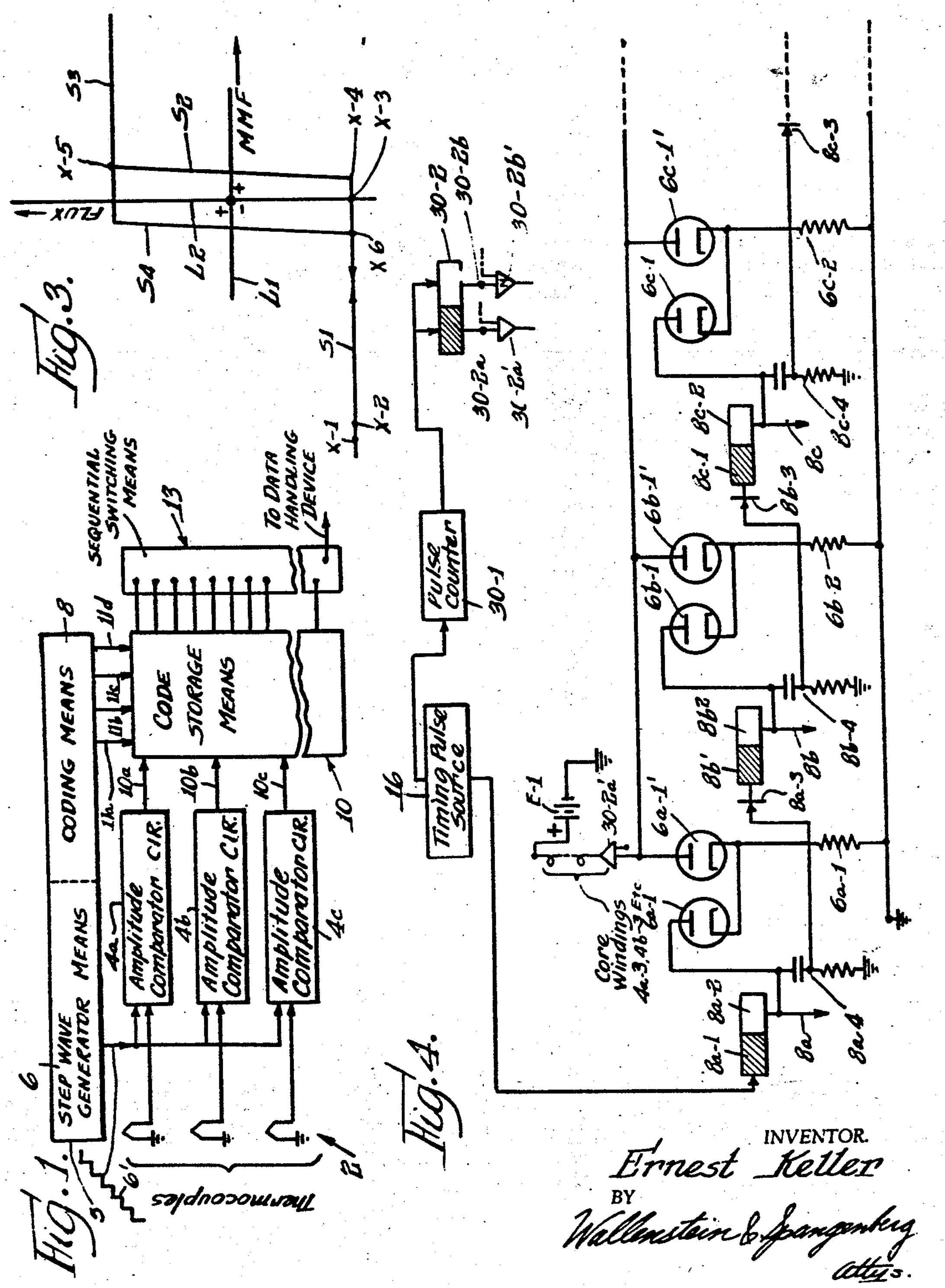
Fig. 3 shows a hysteresis curve of the core units of the comparison circuit and storage units.
Fig. 4 is a circuit diagram of the most preferred form of step wave generator.

Referring now to Fig. 1, the basic system of the invention includes a large number of signal sources 2 in the form of transducers which provide analog voltage outputs which are a measure of the values of the variables to be monitored and measured by the system of the invention. When the transducers are thermocouples, the level or magnitudes of the outputs thereof are exceedingly small which creates problems of the kind outlined above in the introductory portion of the specification affecting the speed and accuracy of the system. In accordance with the present invention, the output of the transducers 2 are connected respectively to one of the inputs of separate comparator circuits, **4*a*, 4*b*, 4*c*, etc. Each of these comparator circuits has a second input fed in common by an input signal control means 5. The input signal control means provides an analog control voltage or current signal in the form of a signal having a progressively varying amplitude, most preferably a stepped waveform 6′, and a progressively varying multi-bit binary signal representing the level of the analog signal at any instant. These two signals should be accurately synchronized and can be generated by completely separate but synchronized circuits or may be derived from the same circuit or different parts of the same circuit, in a manner to be explained. For example, the binary coding means may form part of a step wave generator circuit by directly controlling the level of current or voltage in the analog output portion of the circuit. In any event, those circuit components forming the analog output will be sometimes referred to as step wave generator means 6 and the components which form the binary output will be sometimes referred to as coding means 8, even though common components may be involved. Where the analog control signal has a stepped waveform, each step is equivalent to a change in one apparent unit of the value of the variables involved. In the case where the transducers have different scale factors, the outputs of the transducers may be modified by suitable well known scale factor correction means so that a one-unit variable change will produce the same change at the input of the comparator circuits. Alternatively, the scale factor correction can be made within the comparator circuit itself. When the level of the stepped waveform 6′ and the transducer derived signal compared therewith in a given comparator circuit reaches a given state of comparison, an output pulse is generated at the output of the comparator circuit. At any given instant of comparison, pulses are generated in each and every comparator circuit output whose transducer derived signal input represents the same numerical variable value. The binary code signal at the output of the coding means 8 changes at the beginning of each level of the stepped waveform 6′** to indicate a new number, preferably only one unit greater than or less than the previous number, representing the value of the variable which the system is looking or scanning for at the various transducer outputs at that instant.

The coding means 8 is associated with a code storage means 10 having separate inputs **10*a*, 10*b*, 10*c*, etc. to which the various outputs of the amplitude comparator circuits 4*a*, 4*b*, 4*c*, etc. are respectively fed. The code storage means performs an important function in the analog to digital conversion operation to be performed, and includes a separate storage position for each variable in which is to be stored an indication of the multi-bit, binary coded number which represents the value of the variable involved. The code storage means includes means responsive to the signals on the output lines 10*a*, 10*b*, 10*c*, etc. of the comparator circuits and to the code indication of the coding means at the instant of generation of the signals at the outputs of the comparator circuits for storing in said storage positions the coded indications of the values of the variables involved. The information in the various storage positions of the code storage means 10 may be read out when desired sequentially in the order of the storage positions to operate other data handling devices, usually operated by the feeding of successive data signals thereto, by suitable sequential switching means 13. The system just described does not require the switching of the analog voltage outputs of the transducers 2**, and thus, to a great degree, avoids the accuracy and speed limitations inherent in the mechanical and to a lesser degree the electronic switching of low level analog signals as in prior scanning systems. The mechanical or electronic switching of binary coded information does not, of course, suffer from the disadvantages inherent in the switching of analog voltage signals.

In the broadest aspect of the invention, the various components above described may take a variety of forms. More specific aspects of the invention, however, deal with specific types of components and their novel relationship with various other parts of the system.

Refer now to the embodiment of the invention illustrated in Figs. 2*a* and 2*b*, which is the most preferred form of the invention. In this embodiment, both the comparator circuits **4*a*, 4*b*, etc. and the code storage means 10 are made of magnetic core units preferably of the type having the rectangular hysteresis curve shown in Fig. 3. Moreover, in order to decrease the scanning period so that it is not necessary to await the sequential readout of the information stored in the code storage means before beginning a new scanning cycle, a pair of code storage units 10 and 10′ are provided so that while information on certain variables is being sequentially read out from one of the storage units 10 or 10′**, fresh binary coded information on the same or other variables is being taken in the other storage unit. Since storage and readout operations are occurring simultaneously, for a given number of variables, the time between successive scannings of any variable is reduced by a factor of one half. In other words, the system substantially continuously scans the variables involved and continuously stores and reads out data on the variables.

Each of the magnetic core units **4*a*, 4*b*, etc. comprises a ring 4*a*–1, 4*b*–1**, etc. of permanently magnetizable material having the rectangular hysteresis curve in Fig. 3. The output of the transducer 2a, 2b, etc. are respectively connected to input windings 4a–2, 4b–2, etc. of the magnetic core units 4a, 4b, etc., and the output of the step wave generator 6 is connected to input windings 4a–3, 4b–3, etc. of all of the magnetic core units. In the embodiment illustrated in the drawings, different comparator circuits 4a—4a', 4b—4b', etc. are respectively associated with the storage units 10 and 10'. Output signals of the comparator circuits coupled to these respective storage units are available at the respective inputs of the storage units only during different alternate cycles of operation of the step wave generator 6. The output of the step wave generator means 6 is alternately coupled to the input windings of the comparator circuits associated with storage units 10 and 10' through "and" and "not" gates 30–2a' and 30–2b' respectively.

The input windings of each core unit are connected in backing relationship so that the resultant magnetomotive force produced thereby is the arithmetic difference between the two magnetomotive forces produced by the currents flowing in them. Each of the core units further has an output winding 4a–4, 4b–4, etc. in which a pulse is induced as the magnetic state of the core varies from one saturated state to the opposite saturated state.

Magnetic core units of this type are now well known in the art and, when connected into the circuit shown in Figs. 2a or 2b, the operation of the same can be explained as follows:

In Fig. 3, the abscissa line L1 indicates units of magnetomotive force which is positive in sign to the right of an ordinate line L2 and negative to the left of this line. The ordinate of the hysteresis curve thereshown indicates resultant magnetic flux which is positive above the line L1 and is negative below the line L1. Point x–1 on a hysteresis curve segment S1 represents the flux condition in a magnetic core unit of the type being described for a given current output of the transducer associated therewith, which may be assumed to be a thermocouple, when the output of the step wave generator 6 is zero. If, then, the output of the step wave generator 6 is increased in a given direction from zero an amount equal to the voltage change for one unit of temperature in a direction which will bring the net magnetomotive force acting in the core toward the ordinate line L2, then the point of operation on the curve segment S1 will move to, say, a point x–2. As the step wave output of the step wave generator 6 increases in discrete steps, a point is reached where the resultant magnetomotive force in the core is zero at a point x–3 on the ordinate line L2.

As is common in magnetic materials of the rectangular hysteresis curve type, the knee point x–4 is reached a small distance beyond the zero magnetomotive force point, and for purposes of illustration it may be assumed that this point is substantially reached at the next step of the output of step wave generator 6. Up to this point, the core is said to be saturated, which is a condition where a change in magnetomotive force has little or no effect on the amount of magnetic flux in the core. However, as the voltage increases one more step, an unsaturated segment S2 of the hysteresis curve is reached, thereby resulting in a change of flux within the core. Since in the rectangular type hysteresis curve, only a very small change in magnetomotive force is necessary to move the point of operation of the core from one knee point x–4 to the other x–5, it is quite possible to obtain this degree of change in a single incremental step of the output of the step wave generator 6. To obtain this degree of sensitivity, it may be necessary to utilize a great number of turns in the input windings of the core unit or the resistance of the windings may be reduced to a point where it is practically zero. This latter result may be obtained by immersing the core units in liquid helium where the temperature is near absolute zero. Alternatively, if an incremental change in the output of the step wave generator 6 is not of itself sufficient to change the operating point of the core from one saturated state to the opposite saturated state, then a suitable feed-back winding may be added to each core so that as soon as the unsaturated segment S2 is reached, a feed-back voltage will be generated which will drive the core to the opposite saturated state represented by the curve segment S3. At any rate, when a given state of comparison exists between the output of the step wave generator 6 and the transducer output involved, a pulse will be generated in the output winding 4a–4, or 4b–4, etc., of the core unit due to the change of flux occurring when the core unit is operating along the unsaturated curve segment S2.

Upon completion of a cycle of the operation of the step wave generator 6, the output thereof returns to zero, thereby returning the resultant magnetomotive force conditions of all of the cores back to point x–1 on curve segment S1. Due to the hysteresis characteristics of the curve, this condition is reached as the point of operation of the core goes through another unsaturated state represented by curve segment S4 which joins the saturated curve segment S1 previously mentioned at point x–6. The pulse which is generated in the output winding during the return excursion of the magnetomotive force condition of the core, may be filtered out by use of a suitable means such as rectifier 13a, 13b, etc., connected to the associated output windings.

As shown in Fig. 2a, the step wave generator 6, which in accordance with a broad aspect of the invention may be any one of well known type of step wave generators, preferably an electronic step wave generator, is synchronized directly from a source of suitable timing pulses 16 or indirectly therefrom via the coding means 8 which in turn may be synchronized from the source of pulses 16. However, in accordance with one of the specific aspects of the invention, the step wave generator 6 is preferably of the kind shown in Fig. 4, where the step wave generator is preferably a current generator including a number of current paths connected in parallel through respective diode rectifiers 6a–1', 6b–1', 6c–1', etc., to a common point on the anode sides thereof. The common point is connected to the positive side of a source of voltage E1 through a common load resistance which may be the input windings 4a–1, 4b–1, etc., of the core units 4a, 4b, etc., of the comparator circuits connected in series circuit relation. The parallel current paths have respective load resistances 6a–2, 6b–2, 6c–2, etc., which when connected in parallel form a net resistance which is much larger (e.g. ten times larger) than the common load resistance formed by the core windings so that the current respectively flowing in the parallel paths is controlled solely by the path resistances therein. The conductive and nonconductive states of the current paths are controlled by the respective stages of a scale-of-two pulse counter forming said coding means 8, there being one stage per parallel path. The path resistance 6a–2, 6b–2, etc., are related by powers of two in inverse order to the stage of the counter controlling the particular paths involved. Thus, if a ten stage scale-of-two binary counter is used, if the path resistance associated with the last $2^{10}$ stage of the counter is 1,000 ohms., the path resistance of the path associated with the first stage of the counter would be $2^{10}\times 1{,}000=1{,}024\times 1{,}000$, the path resistance of the path associated with the second stage of the counter would be $512\times 1{,}000$ ohms., etc.

The scale-of-two counter 8 may comprise a series of serially connected bistable stages, each of which may be made from vacuum tubes, magnetic cores, transistors, etc. Where each stage is formed of vacuum tubes, it may comprise a flip-flop or bistable multivibrator circuit including plate to grid, capacity coupled, alternately conducting vacuum tubes, indicated by reference characters 8a–1, 8a–2; 8b–1, 8b–2; or 8c–1, 8c–2, etc., which are rendered alternately conducting by successive pulses fed thereto. As is customary in such circuits, the plate voltage of one of the tubes of each stage alternates between a high positive potential and a low potential as it is respectively triggered between non-conductive and conductive states. Output lines 8*a*, 8*b*, 8*c*, etc., extend from the plates of the normally non-conducting tubes of the respective stages of the counter and, in the normal condition thereof, they have a high positive voltage thereon which is higher than the output source E1 applied to the diodes 6*a*–1′, 6*b*–1′, etc. The counter output lines 8*a*, 8*b*, 8*c*, etc., contain the binary code signals fed to the storage units 10 or 10′ and, accordingly, may be connected thereto through "and" and "not" gates 30–2*a*′ and 30–2*b*′ (Fig. 2*a*). The output lines 8*a*, 8*b*, 8*c*, etc., are also connected respectively to the anodes of diodes 6*a*–1, 6*b*–1, 6*c*–1, whose cathodes are respectively connected to the cathodes of the diodes 6*a*–1′, 6*b*–1′ and 6*c*–1′ so that the current normally flowing through the former diodes renders the latter non-conductive. As the counter tube to which each of the output lines 8*a*, 8*b*, 8*c*, etc., is connected is rendered conductive, the associated diode 6*a*–1, 6*b*–1 or 6*c*–1, etc., becomes non-conducting and the associated current path and diode 6*a*–1′, 6*b*–1′ or 6*c*–1′ becomes conducting. The current flowing through the core windings 4*a*–3, 4*b*–3, etc., is the sum of the currents flowing through the current paths conducting at any instant and, due to the relationship of the values of the path resistances 6*a*–1, 6*b*–1, and 6*c*–1 and the binary code provided by a scale-of-two counter, this current flow is proportional to the number of pulses fed to the counter since the beginning of the count cycle involved. The cores could be replaced by a suitable current amplifying means, such as a transistor amplifier which drives the core windings.

As is conventional in binary counters 23, a sharp pulse may be generated as the output tube in each stage changes conducting states by means of a capacitor-resistance differentiating circuit such as 8*a*–4, 8*b*–4, or 8*c*–4, etc., connected to the plate of such tube. The polarity of the pulse depends on the direction of change of the state of conduction of the tube involved, and only pulses of a given polarity are fed to the succeeding stage of the counter by means of diode rectifiers 8*a*–3, 8*b*–3 or 8*c*–3, etc. connected to the low voltage side of the associated capacitor. It can be seen that with a counter arrangement of this type, the high and low voltage conditions of the output lines 8*a*, 8*b*, 8*c*, etc. at any instant will represent the binary code identifying the particular level of the reference signal waveform at such instant. The pulse counter 8 may be a self-resetting counter circuit so that after a given number of pulses, the counter will reset itself to zero or any other reference number. This will also reset the step wave generator so that it can begin a new cycle of operation.

The output of the pulse source 16 is also fed to a programmer (generally indicated in Fig. 2*a* by reference numeral 30). The programmer may comprise any suitable pulse counter 30–1 to which the pulses from the pulse source 16 are fed. When the pulse counter 30–1 has received a number of pulses equal to the number of steps desired in the step wave output of the step wave generator 6, a pulse is produced in its output which is fed to a suitable bistable circuit 30–2 which, like each stage of the scale-of-two counter making up the coding means, may comprise a two-position stability multivibrator wherein each pulse in the output of the pulse counter reverses the conducting states of the two tubes thereof, only one of which is conducting at any instant. An output line 30–2*a* extends from one of the stages and an output line 30–2*b* extends from the other of these stages. When the tube to which each of these output lines is connected is conducting, the D.C. voltage on that line is at a relatively low positive potential or a negative potential, and when the associated stage is non-conducting, the voltage on the associated output line is at a relatively high positive voltage. One of these output lines 30–2*a* is connected to all of the "and" gates numbered 30–2*a*′ and the other line 30–2*b* is connected to all of the "not" gates numbered 30–2*b*′. A high voltage fed to the input of any of these gate circuits will open the gate and a low voltage fed thereto will close the gate. Obviously the gates 30–2*a*′ and 30–2*b*′ are opened during the alternate cycles of operation of the step wave generator. These various gate circuits control the switching of the various inputs and outputs of the storage units 10 and 10′ and other switching operations to be described.

Referring again now more particularly to Figs. 2*a* and 2*b*, among other things it has been explained how the coding means 8 provide a binary coded output on its output lines identifying each level of the output of the step wave generator 6 and how the output pulses in the comparator circuits are produced. These various outputs are alternately connected to the storage units 10 and 10′ which will now be described. In the most preferred form of the invention, each of the storage units comprises what is generally referred to as a magnetic core matrix. In a magnetic core matrix, magnetic cores such as 10*a*–1, 10*a*–2, etc.; 10*b*–1, 10*b*–2, etc. each in the shape of a ring, are arranged in successive horizontal rows with the corresponding cores of each row falling in respective columns. Each of the cores has the rectangular-type of hysteresis curve shown in Fig. 3 and the cores of each row of cores have a wire 10*a*, 10*b*, 10*c*, or 10*d*, etc. passing through the various cores so as to constitute serially connected input windings for the various cores in each row. Similarly, wires 11*a*, 11*b*, 11*c*, 11*d*, 11*e*, 11*f*, 11*g*, 11*h*, 11*i*, or 11*j*, etc. pass through the centers of the cores in the respective columns of cores to form serially connected input windings for the cores in each column. A single wire 12 extends through all of the cores of each storage unit to constitute serially connected output windings. From this arrangement of the magnetic core matrix, it is apparent that a current pulse flowing through any of the horizontal or row wires 10*a*, 10*b*, 10*c*, 10*d*, etc. will momentarily produce a magnetomotive force in each of the cores of that row. Similarly, a current flowing in any of the column wires 11*a*, 11*b*, etc. will produce a magnetomotive force in all of the cores of the column involved. The design of each core unit is such that upon the simultaneous occurrence of current flow of a given polarity and exceeding certain predetermined values in the two input windings thereof that the core will be driven from a reference saturated state, which might be represented by curve segment S1 in Fig. 3, to the opposite state of saturation represented by the curve segment S3 in Fig. 3. If only one of the input windings contains a current of said proper polarity and magnitude, the core will not be driven between said above-mentioned states of saturation but will remain in its then state of saturation.

The various output lines, 8*a*, 8*b*, 8*c*, etc. of the coding means are alternately connected to the column lines 11*a*, 11*b*, 11*c*, etc. of the storage units 10 and 10′ through "and" gates 30–2*a*′ and "not" gates 30–2*b*′, respectively, controlled by programmer 30 previously described, said respective gates being open during alternate cycles of operation of the step wave generator 6 so that the storage units are alternately rendered operative for data read-in operations. In the same way, the outputs of comparator circuits 4*a*, 4*b*, etc. and 4*a*′, 4*b*′, etc. are connected to the row lines 10*a*, 10*b*, etc. of the storage units 10 and 10′ through "and" gates 30–2*a*′ and "not" gates 30*b*′, respectively during alternate cycles of operation of the step wave generator so that both the comparator circuits and the coding means are connected to the row and column input lines only when the associated storage unit is to receive information therefrom.

As above explained, one of the binary indications on each of the output lines 8*a*, 8*b*, 8*c*, etc. of the coding means is represented by a high positive voltage whereas the opposite binary indication is indicated by a lower positive or a negative voltage. If desired, however, these binary indications may be indicated respectively the presence or absence of a pulse. In the present example, the core of any magnetic core unit is not switched from a reference state of magnetic saturation to the opposite state of magnetic saturation unless the column line of a particular core is receiving the high voltage signal from the coding means at the same time that it is receiving a pulse of a given polarity from the output of the associated comparator circuit. With this arrangement, it can be readily seen that the multi-bit binary code indicated by the magnetic states of the cores in any particular row will be a measure of the value of the associated variable.

Thus far it is apparent how the storage unit 10 or 10′ will receive information on different groups of variables in successive cycles. It will now be explained how the information stored in any particular storage unit during a given scanning cycle is readout during tthe succeeding scanning cycle.

In data handling systems utilizing binary coded signals, it is quite common to feed each binary code group to a data handling device by the sequential feeding of the bits of each code group to such device, which might be another storage unit, such as the drum storage unit 35 indicated in box form in Fig. 2*a*, or some other buffer storage device as indicated by reference numeral 36. To this end, suitable row and column switching units 13–1 and 13–2 are provided which sequentially feed readout pulses to the various row and column lines 10*a*, 10*b*, 10*c*, etc. and 11*a*, 11*b*, 11*c*, etc. in column by column and row by row succession in a manner which returns the magnetic cores which were previously driven to a second state of magnetic saturation back to the reference state of saturation to thereby produce a change of flux in the core as the unsaturated part of the hysteresis curve is reached. In effect, the condition of the cores in each row are scanned core by core and whenever the core scanned is in said second state of magnetization, a pulse is generated in the common output line 12 or 12′. The switching units may take a variety of forms. For example, they may be conventional telephone-type stepping switches which operate to feed sequentially the proper readout voltage to one of the storage units 10 or 10′ on their output lines 12–1*a*, 13–1*b*, 13–1*c*, etc., 13–2*a*, 13–2*b*, 13–2*c*, etc. while the other storage unit is receiving information from the comparator circuits and coding means. Following the completion of the readout operation on the storage unit involved and a read-in operation on the other storage unit, the switching units feed the read-out pulses to the latter unit.

The switching units 13–1 and 13–2 may also be magnetic core shift registers synchronized directly or indirectly from the timing pulse source 16. A magnetic core shift register generally consists of a number of cascaded stages of magnetic core units which are initially in a reference state of magnetic saturation except for the first stage which is in the opposite state of saturation. So called advance pulses are fed to the input of the shift register which pulses have a polarity which will drive any core in said opposite state of magnetization back to the reference state of magnetization. As a core is triggered back to the reference state of magnetization, it generates a pulse which appears on the output line thereof, such as 13–1*a*, or 13–1*b*, etc. of such stage and which triggers the following stage into said opposite state of magnetization. As each succeeding advance pulse is received, the cores successively assume said opposite state of magnetization, and the core which generated the pulse which triggered the core in such opposite state is at the same time returned to the reference state resulting in a read-out pulse being generated at its output line 13–1*a* or 13–1*b*, etc. A magnetic core shift register is disclosed in the Automatic Control Magazine, April 1956 edition, pages 15 through 19.

In the case of row shift register 13–1, the pulses generated on its output lines would be used to trigger respective bistable multivibrator units, not shown, into a state which would generate a continuous p )aring voltage which would be fed to the selected row input line 10*a*, 10*b*, etc. involved, so that the cores in such row are prepared to be returned to the reference state of magnetization, if they were previously in said opposite state of magnetization, when a pulse of proper polarity is fed to the associated column input line. Since the column shift register 13–2 need not provide its voltage for any length of time, the pulses sequentially generated on its output lines may directly drive the cores of the rows selected by the row shift register.

Whatever type of shift register or scanning switch is utilized, they would each have a series of output lines 13–1*a*, 13–1*b*, 13–1*c*, 13–1*d*, etc. connected through "not" gates 30–2*b*′ controlled by the programmer 30 to the respective row lines 10*a*, 10*b*, 10*c*, 10*d*, etc. of the storage unit 10 and through "and" gates 30–2*a*′, respectively to the row input lines 10*a*, 10*b*, 10*c*, 10*d*, etc. of the storage unit 10′. The pulse appearing at the last output line, 13–2*n* of the column step switch or shift register would be used to advance the row switch or register one position to prepare the next row of cores for a read-out operation. The column step switch or register receives its advance pulses directly from the pulse source 16 via line 38. The binary code group stored in a particular row is thus readout in terms of the number and placement of pulses in a given time interval wherein at any reference time position within such interval one binary indication is represented by the presence of a pulse and the opposite binary indication is represented by the absence of a pulse.

It will be assumed for purposes of a simplified representation of the invention, that the storage unit being readout will be completely scanned in the same time period required for one period of operation of the step wave generator 6. If this is not the case, then suitable interlock means must be provided for preventing the beginning of a new cycle of operation of the step wave generator 6 before the scanning of the storage unit then being readout has been completed, or vice versa, depending upon which operation is performed in the shortest time.

The output line 12 of the storage unit 10 is connected to a point 42 (see Fig. 2*a*) through a "not" gate 30–2*b*′ and the output line 12′ of the storage unit 10′ is connected (Fig. 2*b*) to the point 42 through an "and" gate 30–2*a*′. In this manner the output line of the storage unit which is being readout is connected to the point 42 which leads to the drum storage unit 35 or other suitable storage device 36 through suitable gate circuits 44 and 46, respectively, controlled by suitable programming means (not shown). When desired, the information stored in the storage devices 35 or 36 is readout to a suitable recording device 48 via respective gates 50 and 52 also controlled by said suitable programming means.

Now that the most preferred form of the invention, other and less preferred forms thereof will be described so that the scope of the broad aspects of the invention can best be appreciated. Refer now to Fig. 5 which shows a less preferred form of comparator circuit which may be substituted, in some cases, for the magnetic core comparator circuits just described where greater size, weight, complexity and cost of the equipment can be tolerated. In this embodiment, the thermocouples or transducers 2*a*, 2*b*, 2*c*, etc. are connected respectively to D.C. amplifiers 54*a*, 54*b*, 54*c*, etc. The outputs of the D.C. amplifiers are connected respectively through resistors 56*a*, 56*b*, 56*c*, etc. to the anodes 58*a*, 58*b*, 58*c* of diode rectifier tubes 59*a*, 59*b*, 59*c*, etc. whose cathodes 60*a*, 60*b*, 60*c*, etc. are connected to ground through respective resistors 62*a*, 62*b*, 62*c*, etc. The cathodes 60*a*, 60*b*, 60*c*, etc. are respectively connected to the cathodes 62*a*, 62*b*, 62*c*, etc. of diode units 64*a*, 64*b*, 64*c*, etc.

whose anodes *66a*, *66b*, *66c*, etc. are connected through respective resistors *68a*, *68b*, *68c*, etc. to the output of the step wave generator 6.

Assuming that the polarity of the outputs of the D.C. amplifiers is such that the output lines thereof have positive direct current voltages, the output of the step wave generator 6 is either directly or indirectly through suitable conversion means arranged to provide a stepped voltage waveform 6″ which progressively decreases in magnitude from an initial positive value toward zero voltage in discrete steps. In a case where the transducer outputs increase with increasing value of the variable, then the number of steps required to reach this level will be inversely related to the value of the variables. An inverse error of this type can be readily corrected by utilizing suitable correction factor means at any point following the storage units 10 and 10′. In any event, the code stored in the storage units will be a function of the values of the variables. With the circuit arrangement described, whenever the level of the stepped voltage waveform fed to the anodes of the diodes *64a*, *64b*, *64c*, etc. exceeds the output of the D.C. amplifiers *54a*, *54b*, *54c*, etc., the diodes *59a*, *59b*, *59c*, etc. will be rendered non-conductive. As soon as the stepped voltage waveform 6″ reaches a level which is below the output of the D.C. amplifier involved, then the particular diode *59a*, *59b* or *59c*, etc. involved will become conductive. A voltage pulse thereby appears at the anode of the diode unit *59a*, *59b* or *59c*, etc. involved which pulse is coupled to diode *74a*, *74b* or *74c*, etc. through an associated condenser *70a*, *70b* or *70c*, etc. connected to ground through resistors *72a*, *72b*, *72c*, etc., the respective resistor condenser circuits forming differentiating or peaking networks. The diodes *74a*, *74b*, or *74c* filter out unwanted negative pulses generated by the differentiating networks. Positive pulses pass through the above-mentioned diodes *74a*, *74b*, *74c*, etc. to the control grid of suitable bistable trigger circuits *76a*, *76b*, *76c*, etc. which may be one-shot multivibrator, pulse shaping circuits which generate greatly amplified pulses in their output lines *78a*, *78b*, *78c*, etc. respectively containing current transformers *80a*, *80b*, *80c*, etc. The output of these current transformers are connected to "and" gates, *30–2a′* if they are associated with storage unit 10. If the comparator circuits being discussed are associated with the storage unit 10′, then the outputs of these transformers would be connected to "not" gates like *30–2b″*, previously mentioned. The output of the gates are respectively connected to input lines *10a*, *10b*, etc. of the associated storage unit.

Figs. *6a* and *6b* show a less preferred form of storage unit 10″ which may be substituted for the magnetic core storage units 10 or 10′ insofar as a broad aspect of the invention is concerned. The storage unit shown in Figs. *6a* and *6b* is a relay matrix storage unit wherein relay units *82a—83a—84a*, etc., *82b—83b—84b*, etc., *82c—83c—84c*, etc., are respectively arranged in successive rows with the corresponding relay unit in each of the rows being arranged in respective columns. The relay units in the various rows are fed by respective input lines *10a*, *10b*, *10c*, *10d*, etc. which may correspond to the similarly numbered input lines of the magnetic core matrix storage unit 10 or 10′ previously described. Similarly, the relay units of the various columns are fed by respective column input lines *11a*, *11b*, *11c*, etc. corresponding to the similarly numbered column lines of the magnetic core matrix storage unit 10 or 10′ previously described. Since each of the relay units may be identically constructed, only one of these units, namely, relay unit *82a* will now be described.

The relay units *82a* has three windings *82a–1*, *82a–2*, and *82a–3* (Fig. *6a*) wound around a common core, holding contacts *82a–4* and binary code indicating contacts *82a–5* (see Fig. *6b*). The winding *82a–1* is connected between the associated row input line, which in the example is indicated by reference numeral *10a*, and a ground branch line *90a* leading to a main ground line 92. All of the other windings of the relay units of any particular row of relay units corresponding to the first-mentioned winding *82a–1* are similarly connected between the associated row input lines *10a*, *10b*, *10c*, *10d*, etc., and the associated branch ground line *90a*, *90b*, *90c*, etc.

The winding *82a–2* is connected between the associated column input line, which, in the example is column line *11a*, and the associated branch ground line *90a*. Likewise, all of the windings of the relay units in each column corresponding to the relay winding *82a–2* are similarly connected between the associated column input line *11a*, *11b*, *11c*, etc., and the associated branch ground lines *90a*, *90b*, *90c*, etc.

One of the terminals of the third winding *82a–3* is connected to the holding contacts *82a–4*, which are normally open, which contacts in turn are connected to a high voltage branch line *94a* extending to a main high voltage line 96 which extends through a set of normally-closed resetting contacts 100 to the positive terminal 98 of a source of regulated direct current voltage. The negative terminal 99 of this voltage source is connected to the main or common ground line 92. The other terminal of the winding *82a–3* is connected to the branch ground line *90a*. All of the windings of the relay units in each column corresponding to the third mentioned relay winding *82a–3*, likewise extend between the associated branch ground lines *90a*, *90b*, *90c*, etc. through the associated holding contacts corresponding to the holding contacts *82a–4* to the associated column high voltage branch lines *94a*, *94b*, *94c*, etc.

In order for any relay unit to be energized (i.e. operate its contacts), it is necessary that D.C. voltages of the proper polarity and magnitudes be simultaneously applied to the first and second mentioned windings thereof corresponding to the windings *82a–1* and *82a–2*. Accordingly, the comparator circuit output pulses appearing on the row input lines *10a*, *10b*, *10c*, *10d*, etc. and the high voltage conditions of the output lines of the coding means 8 feeding the column input lines *11a*, *11b*, *11c*, etc., are adjusted to values which will energize the relays if they are fed simultaneously to the input windings of any relay unit. In this way, the energized conditions of the relays represent the binary representations of the values of the variables associated with the various rows of relay units. As soon as any relay unit becomes energized, the associated holding contacts corresponding to contacts *82a–4* close to energize the third winding of the unit corresponding to winding *82a–3* from the source of direct current voltage connected to the terminals 98 and 99. The flux produced by the current flowing in the windings *82a–3* is sufficient to hold the relay in its energized condition in the absence of voltages on the other windings. Energization of any particular relay closes the associated #5 contacts shown in Fig. *6b*, which contacts are all identified similarly to the associated relay.

One of the terminals of each of the #5 contacts of the relay units of each column of relay units is connected to a common branch line *103a*, *103b* or *103c*, etc. leading to a main high voltage line 104 extending to the above-mentioned positive terminal 98. The other terminals of the contacts of the relay units in each row may be connected respectively to different contacts of a step switch *13–1a*, *13–1b*, *13–1c*, or *13–1d*, etc. which sequentially scan the various contacts in each row, and in row by row succession. If desired, instead of mechanical switches, electronic gating or switching means may be utilized. The wipers of the stepping switches *13–1a*, *13–1b*, *13–1c*, *13–1d*, etc. are connected respectively to successive stationary contacts of a master stepping switch *13–2′* whose wiper extends to a suitable data handling device. Since the open and closed contacts represent opposite binary states, which are the presence and absence of a voltage, it can be seen that with the arrangement of the above described, the information readout from the contact matrix shown in 6b will be binary code groups indicating the values of the associated variables.

Reference should now be made to Fig. 7 showing a still further modified and less preferred form of storage unit which falls within the purview of a broad aspect of the invention. In this embodiment, the storage unit and coding means utilize a roating magnetic drum 10'''. The drum has a series of axially spaced storage sections 10'''–1, 10'''–2, 10'''–a, 10'''–b, 10'''–c, 10'''–d, etc. The first section 10'''–1 may contain a magnetized pulse-producing point in each circumferential storage point or area of the drum, which magnetized point generates a pulse in a suitable pick-up head 10'''–3. The pulses generated in the pick-up head 10'''–1 take the place of the timing pulse source 16 in the various previously described embodiments and is used to synchronize the operation of the step wave generator 6. The second section 10'''–2 of the drum includes at each of said circumferential points or areas of the drum a series of axially spaced magnetized points providing a multi-bit binary coded indication identifying the number of the associated circumferential point on the drum relative to a starting or zero point thereon and thus represent the various possible values of the variables being monitored by the system. The second section 10'''–2 of the drum is thus a substitute for the coding means 8 previously described. A separate pick-up head would, of course, be associated with each axial storage channel or point in drum section 10'''–2. Each of the other axial storage sections of the drum, namely, sections 10'''–a, 10'''–b, 10'''–c, etc. has a recording and pick-up head associated therewith which is fed by respective input lines 10a, 10b, 10c, 10d, etc. connected to the outputs of the various comparator circuits above described. With the arrangement just described, it can be seen that during a cycle of operation of the output of the step wave generator 6, which is assumed to take place in one revolution of the drum, each of the storage sections 10'''–a, 10'''–b, etc. of the drum will contain a recorded magnetic signal having a circumferential position corresponding to the multi-bit binary code group which identifies the value of the associated variable. For read-out purposes, each of the pick-up and recording heads associated with the storage sections 10'''–a, 10'''–b, 10'''–c, etc. are connected to successive stationary contacts of a suitable scanning switch, such as a telephone type stepping switch 13–2'. The rate of advancement of the wiper of the step switch 13–2' can be timed with the speed of rotation of the drum so that the output of the read-out heads associated with the different storage sections of the drum are successively connected to the wiper of switch 13–2' each revolution of the drum. As the circumferential position containing the recorded magnetic signal moves across the selected read-out head, a pulse is induced therein which appears on the wiper stepping switch 13–2'. This pulse is utilized to open a suitable normally-closed gate circuit 106 having inputs fed by the pick-up heads of the code storage section 10'''–2. It can thus be seen that the output of the gate circuit 106 is a binary code which represents the value of the variable associated with the storage section of the drum being scanned at any instant.

It should be understood that numerous modifications may be made of the various embodiments of the invention above described, without deviating from the broader aspects of the invention.

I claim as my invention:

1. An information handling system comprising a number of signal sources providing signal outputs whose amplitudes are functions of the values of respective variables, a storage unit having separate storage positions for data on each variable and separate inputs to said storage positions which are capable of receiving and storing data in said storage positions simultaneously, a source of a reference signal whose amplitude progressively varies in a definite way independently of the output of the signal sources, a separate amplitude comparator circuit for each of said signal sources, each comparator circuit including a first and second input and an output, said first comparator circuit inputs being respectively connected to the outputs of said signal sources and said second inputs thereof being connected in common to the output of said reference signal source, each of said comparator circuits including means for generating a given control signal at the output thereof whenever the signals fed to said inputs thereof reach a given state of amplitude comparison, a coding means common to all of said comparator circuits and operated in synchronism with said reference signal source for providing multi-bit binary code groups progressively varying in synchronism with the change in level of the output of said reference signal source, and means responsive to said comparator circuit output signals and the code indication of the coding means at the instant of generation of such signals for feeding signals to said respective storage unit inputs for storing in said storage positions indications of the binary code representing the value of the variables involved.

2. An information handling system comprising a number of signal sources providing signal outputs whose amplitudes are functions of the values of respective variables, a storage unit having separate storage positions for data on each variable and separate inputs to said storage positions which are capable of receiving and storing data in said storage positions simultaneously, a source of a reference signal whose amplitude progressively varies in a definite way, the incremental steps of the discretely varying reference signal being equivalent to a change in one apparent unit of value of the variables involved, a separate signal amplitude comparator circuit for each of said signal sources, each comparator circuit including a first and a second input and an output, said first comparator circuit inputs being respectively connected to the outputs of said signal sources and said second inputs thereof being connected in common to the output of said reference signal source, each of said comparator circuits including means for generating a given control signal at the output thereof whenever the signals fed to said inputs thereof reach a given state of amplitude comparison, coding means common to all of said comparator circuits and operated in synchronism with said reference signal source for providing code groups representing a number progressively varying by one unit at each step in synchronism with the change in level of the output of said reference signal source, and means responsive to said comparator circuit output signals and the code indication of the coding means at the instant of generation of such signals for feeding signals to said respective storage unit inputs for storing in said storage positions indications of the code representing the value of the variables involved.

3. An information handling system comprising a number of signal sources providing signal outputs whose amplitudes are functions of the values of respective variables, a source of a reference signal whose amplitude progressively varies in discrete steps independently of the output of the signal sources, a separate signal amplitude comparator circuit for each of said signal sources, each comparator circuit including a first and a second input and an output, said first comparator circuit inputs being respectively connected to the outputs of said signal sources and said second inputs thereof being connected in common to the output of said reference signal source, each of said comparator circuits including means for generating a given control signal at the output thereof whenever the signals fed to said inputs thereof reach a given state of amplitude comparison, coding means common to all of said comparator circuits and comprising a pulse counter having respective binary code bit output lines and adapted to provide on said lines a multi-bit binary coded signal representing the number of pulses fed thereto from a given reference time, a source of control pulses feeding said pulse counter, means for progressively changing the level of the output of said reference signal source in synchronism with the feeding of pulses to said pulse counter, a storage unit having a separate data storage position for each signal source, each storage position having a number of binary code bit storage points each including a first and a second input, means coupling the output of each comparator circuit to all of the first inputs of the bit storage points of the storage position to contain data on the associated signal source, means connecting each code bit output line of said coding means to all of the second inputs at the corresponding bit storage point of each storage position, and means for providing at each bit storage point a first binary indication when the binary signal fed thereto from said coding means to the second input thereof is a given predetermined one of two possible binary signals and the first input thereof simultaneously receives said control signal from the associated comparator circuit, and to provide at each bit storage point a second binary indication when the input thereof from said coding means is the other binary signal and the first input receives said control signal, the storage positions thereby receiving binary coded data representing the values of associated variables.

4. An information handling system comprising a number of signal sources providing signal outputs whose amplitudes are functions of the values of respective variables, a source of a reference signal whose amplitude progressively varies in a definite way, a separate signal amplitude comparator circuit for each of said signal sources, each comparator circuit including a first and a second input and an output, said first comparator circuit inputs being respectively connected to the outputs of said signal sources and said second inputs thereof being connected in common to the output of said reference signal source, each of said comparator circuits including means for generating a given control signal at the output thereof whenever the signals fed to said inputs thereof reach a given state of amplitude comparison, coding means common to all of said comparator circuits and operated in synchronism with said reference signal source for providing on respective binary code bit output lines multi-bit binary code groups progressively varying in synchronism with the change in level of the output of said reference signal source, a storage unit having a separate data storage position for each signal source, each storage position having a number of binary code bit storage points each including a first and a second input, means coupling the output of each comparator circuit to all of the first inputs of the bit storage points of the storage position to contain data on the associated signal source, means connecting each code bit output line of said coding means to all of the second inputs at the corresponding bit storage point of each storage position, and means for providing at each bit storage point a first binary indication when the binary signal fed thereto from said coding means to the second input thereof is a given predetermined one of two possible binary signals and the first input thereof simultaneously receives said control signal from the associated comparator circuit, and to provide at each bit storage point a second binary indication when the input thereof from said coding means is the other binary signal and the first input receives said control signal, the storage positions thereby receiving binary coded data representing the values of associated variables.

5. An information handling system comprising a number of signal sources providing signal outputs whose amplitudes are functions of the values of respective variables, a source of reference signal whose amplitude progressively varies in discrete steps, a separate amplitude comparator circuit for each of said signal sources, each comparator circuit including saturable magnetic core means of the rectangular hysteresis curve type having a pair of input windings and an output winding, one of said input windings of each core means being connected to the output of a different one of said signal sources and the second input windings of said core means being connected in common to the output of said reference signal source so that the magnetomotive forces produced by the current in the input windings thereof oppose one another, the effect in each core means of the incremental steps of the discretely varying reference signal being equivalent in magnitude to a change in one apparent unit of value of the variables involved, the nature of each of said core means and the windings thereof being such that with the magnetomotive forces produced by the current in said input windings being alike in magnitude the next change in level of said reference signal will produce a sufficient change in magnetomotive force to cause the point of operation on the hysteresis curve thereof to shift between the knees of the hysteresis curve to change the state of magnetization of the core means and produce a control pulse in the output winding thereof, coding means common to all of said comparator circuits and operated in synchronism with said reference signal source for providing on respective binary code bit output lines binary coded signals representing a number progressively varying by one unit at each step in synchronism with the change in level of the output of said reference signal source, and means responsive to said comparator circuit control pulses and the code indication of the coding means at the instant of generation of said pulses for storing in said storage positions indications of the binary code representing the value of the variables involved.

6. An information handling system comprising a number of signal sources providing signal outputs whose amplitudes are functions of the values of respective variables, a storage unit having separate storage positions for data on each variable and separate inputs to said storage positions which are capable of receiving and storing data in said storage positions simultaneously, a source of a reference signal whose amplitude progressively varies in discrete steps, a separate amplitude comparator circuit for each of said signal sources, each comparator circuit including saturable magnetic core means of the rectangular hysteresis curve type having a pair of input windings and an output winding, one of said input windings of each core means being connected to the output of a different one of said signal sources and the second input windings of each core means being connected in common to the output of said reference voltage source so that the magnetomotive forces produced by the current in the input windings thereof oppose one another, the nature of each of said core means and the windings thereof being such that a change of one step in the level of said reference signal once the knee of the hysteresis curve thereof is reached will produce a sufficient change in magnetomotive force to cause the point of operation on the hysteresis curve to shift between the knees thereof to change the state of magnetization of the core means and produce a control signal pulse in the output winding thereof, coding means common to all of said comparator circuits and operated in synchronism with said reference signal source for providing code signals representing a number progressively varying by one unit at each step in synchronism with the change in level of the output of said reference signal source, and means responsive to said comparator circuit output pulses and the code indication of the coding means at the instant of generation of said pulses for feeding signals to said respective storage unit inputs for storing in said storage positions indications of the binary code representing the value of the variables involved.

7. An information handling system comprising a number of signal sources providing signal outputs whose amplitudes are functions of the values of respective variables, a source of a reference signal whose amplitude progressively varies in discrete steps, a separate amplitude comparator circuit for each of said signal sources, each comparator circuit including saturable magnetic core means of the rectangular hysteresis curve type having a pair of input windings and an output winding, one of said input windings of each core means being connected to the output of a different one of said signal sources and the second input windings of said core means being connected in common to the output of said reference signal source so that the magnetomotive forces produced by the current in the input windings thereof oppose one another, the effect in each core means of the incremental steps of the discretely varying reference voltage being equivalent in magnitude to a change in one apparent unit of value of the variables involved, the nature of each of said core means and the windings thereof being such that a change of one step in the level of said reference signal once the knee of the hysteresis curve thereof has been reached will produce a sufficient change in magnetomotive force to cause the point of operation on the hysteresis curve to shift between the knees thereof to change the state of magnetization of the core and produce a control signal pulse in the output winding thereof, coding means common to all of said comparator circuits and operated in synchronism with said reference signal source for providing on respective binary code bit lines multi-bit binary coded signals progressively varying in synchronism with the change in level of the output of said reference signal source, a storage unit having a separate storage position for each signal source, each storage position having a number of binary code bit storage points each including a first and a second input, means connecting the pulse output of each comparator circuit to the first inputs of the bit storage points of the storage position for data on the associated signal source, means connecting each code bit output line of said coding means to the second inputs at the corresponding bit storage point of each storage position, and means for providing at each storage point a first binary indication when the binary signal fed thereto from said coding means to one of the inputs thereof is a given one of two possible binary signals and the other input thereof simultaneously receives said control signal pulse from the associated comparator circuit, and to provide at each bit storage point a second binary indication when the input thereof from said coding means is the other binary signal and the first input receives said control signal.

8. An information handling system comprising a number of signal sources providing signal outputs whose amplitudes are functions of the values of respective variables, a source of a reference signal whose amplitude progressively varies in discrete steps, a separate voltage comparator circuit for each of said signal sources, each comparator circuit including saturable magnetic core means of the rectangular hysteresis curve type having a pair of input windings and an output winding, one of said input windings of each core means being connected to the output of a different one of said signal sources and the second input windings of said core means being connected in common to the output of said reference signal source so that the magnetomotive forces produced by the current in the input windings oppose one another, the effect in each core means of the incremental steps of the discretely varying reference voltage being equivalent in magnitude to a change in one apparent unit of value of the variables involved, the nature of each of said core means and the windings thereof being such that a change of one step in the level of said reference signal once the knee of the curve has been reached will produce a sufficient change in magnetomotive force to cause the point of operation on the hysteresis curve thereof to shift between the knees of the hysteresis curve to change the state of magnetization of the core means and produce a control pulse in the output winding thereof, coding means common to all of said comparator circuits and comprising a pulse counter adapted to provide on a number of binary code bit output lines thereof a multi-bit binary coded signal representing the number of pulses fed thereto from a reference time, a source of control pulses feeding said pulse counter, means for progressively changing the level of the output of said reference signal source in synchronism with the feeding of pulses to said pulse counter, a storage unit having a separate storage position for each signal source, each storage position having a number of binary code bit storage points each comprising a magnetic core storage element including a first and a second input winding and an output winding, means connecting the pulse output of each comparator circuit to the first input windings of the bit storage points of the storage position for data on the associated signal source, means connecting each code bit output line of said coding means to the second input core windings at the corresponding bit storage point of each storage position, said core elements each being driven from a reference state of magnetization to the opposite state of magnetization when the binary signal fed thereto from said coding means to one of the inputs winding thereof is a given one of two possible binary signals and the other input winding thereof simultaneously receives said control signal pulse from the associated comparator, the storage positions thereby receiving binary coded data representing the values of associated variables, and read-out means for feeding read-out pulses to the core windings of each storage position in succession which pulses drive the cores set from said opposite state of magnetization to said reference state of magnetization and generate pulses in the output windings thereof, whereby binary coded pulse groups are generated in th output windings of the cores of each storage position representing the values of the variables involved.

9. An information handling system comprising a number of signal sources providing signal outputs whose amplitudes are functions of the values of respective variables, a source of a reference signal which progressively varies in a definite way, a separate amplitude comparator circuit for each of said signal sources, each comparator circuit including a first and a second input and an output, said first comparator circuit inputs being respectively connected to the outputs of said signal sources, said second inputs being connected in common to the output of said reference signal source, each of said comparator circuits including means for generating a given control signal at the output thereof whenever the signals fed to said inputs thereof reach a given state of comparison, coding means common to all of said comparator circuits and synchronized with said reference signal source for providing on respective binary code bit lines multi-bit binary coded signals progressively varying in synchronism with the change in level of the output of said reference signal source, a storage unit having a separate storage position for each signal source, each storage position having a number of binary code bit storage points each comprising a magnetic core storage element including a first and a second input winding and an output winding, means connecting the pulse output of each comparator circuit to the first input windings of the bit storage points of the storage position for data on the associated signal source, means connecting each code bit output line of said coding means to the second input core windings at the corresponding bit storage point of each storage position, said core elements each being driven from a reference state of magnetization to the opposite state of magnetization when the binary signal fed thereto from said coding means to one of the input windings thereof is a given one of two possible binary signals and the other input winding thereof simultaneously receives said control signal pulse from the associated comparator circuit, and read-out means for feeding read-out pulses to the core windings of each storage position which pulses drive the cores set from said opposite state of magnetization to said reference state of magnetization and generate pulses in the output windings thereof, whereby binary coded pulse groups are generated in the output windings of the cores of each storage position representing the values of the variables involved.

10. An information handling system comprising a number of signal sources providing signal outputs whose amplitudes are functions of the values of respective variables, a source of a reference signal which progressively varies in discrete steps, the incremental steps of the discretely varying reference signal being equivalent to a change in one apparent unit of value of the variables involved, a separate amplitude comparator circuit for each of said signal sources, each comparator circuit including a first and a second input and an output, said first comparator circuit inputs being respectively connected to the outputs of said signal sources, said second inputs being connected in common to the output of said reference signal source, each of said comparator circuits including means for generating a given control signal at the output thereof whenever the signals fed to said inputs thereof reach a given state of comparison, coding means common to all of said comparator circuits and synchronized with said reference signal source for providing on respective binary code bit output lines multi-bit binary coded signals progressively varying in synchronism with the change in level of the output of said reference signal source, a storage unit having a separate storage position for each signal source, each storage position having a number of binary code bit storage points each comprising a magnetic core storage element including a first and a second input winding and an output winding, means connecting the pulse output of each comparator circuit to the first input windings of the bit storage points of the storage position for data on the associated signal source, means connecting each code bit output line of said coding means to the second input core windings at the corresponding bit storage point of each storage position, said core elements each being driven from a reference state of magnetization to the opposite state of magnetization when the binary signal fed thereto from said coding means to one of the input windings thereof is a given one of two possible binary signals and the other input winding thereof simultaneously receives said control signal pulse from the associated comparator circuit, and read-out means for feeding read-out pulses to the core windings of each storage position in succession which pulses drive the cores set from said opposite state of magnetization to said reference state of magnetization and generate pulses in the output windings thereof, subsequent to the completion of a scanning cycle where the reference signal source has scanned the range of anticipated values of said signal source outputs, whereby binary coded pulse groups are generated in the output windings of the variables involved.

11. An information handling system comprising a number of signal sources providing signal outputs whose amplitudes are functions of the values of respective variables, a source of a reference signal which progressively varies in discrete steps, a separate amplitude comparator circuit for each of said signal sources, each comparator circuit including a first and a second input and an output, said first comparator circuit inputs being respectively connected to the outputs of said signal sources, said second inputs being connected in common to the output of said reference signal source, each of said comparator circuits including means for generating a given control signal at the output thereof whenever the signals fed to said inputs thereof reach a given state of comparison, coding means common to all of said comparator circuits and comprising a pulse counter adapted to provide on a number of binary code bit output lines thereof a multi-bit binary coded signal representing the number of pulses fed thereto from a reference time, a source of control pulses feeding said pulse counter, means responsive to said pulse source for progressively changing the level of the output of said reference signal source in synchronism with the feeding of pulses to said pulse counter, a storage unit having a separate storage position for each signal source, each storage position having a number of binary code bit storage points each comprising a magnetic core storage element including a first and a second input winding and an output winding, means connecting the pulse output of each comparator circuit to the first input windings of the bit storage points of the storage position for data on the associated signal source, means connecting each code bit output line of said coding means to the second input windings at the corresponding bit storage point of each storage position, said core elements each being driven from a reference state of magnetization to the opposite state of magnetization when the binary signal fed thereto from said coding means to one of the input windings thereof is a given one of two possible binary signals and the other input winding thereof simultaneously receives said control signal pulse from the associated comparator circuit, and read-out means for feeding read-out pulses to the core windings of each storage position which pulses drive the cores set from said opposite state of magnetization to said reference state of magnetization and generate pulses in the output windings thereof, whereby binary coded pulse groups are generated in the output windings of the cores of each storage position representing the values of the variables involved.

12. An information handling system comprising a number of signal sources providing signal outputs whose amplitudes are functions of the values of respective variables, a source of a reference signal which cyclically progressively varies in a definite way, a separate amplitude comparator circuit for each of said signal sources, each comparator circuit including a first and a second input and an output, said first comparator circuit inputs being connected to the outputs of said signal sources and the second inputs thereof being connected in common to the output of said reference signal source, each of said comparator circuits including means for generating a given control signal at the output thereof whenever the signals fed to said inputs thereof reach a given state of comparison, coding means common to all of said comparator circuits and synchronized with said reference voltage source for providing on respective binary code bit output lines multi-bit binary coded signals progressively varying in synchronism with the change in level of the output of said reference signal source, a pair of storage units each having separate storage positions for data on respective variables, each storage position having a number of binary code bit storage points each comprising a first and a second input, means operatively coupling at least some of said comparator circuits respectively to the first inputs of the storage positions of one of the storage units during alternate cycles of said reference signal and operatively coupling at least some of said comparator circuits respectively to the first inputs of the storage positions of the other storage unit during the intervening alternate cycles of said reference signal, means operatively coupling each binary code bit output line of said coding means to the corresponding bit storage point of said storage units in synchronism with and in the same order as the outputs of said comparator circuits are operatively connected to said inputs of said storage positions of said respective storage units, means associated with each of said storage units for providing at each bit storage point a first binary indication when the binary signal fed thereto from said coding means to one of the inputs thereof is a given one of two possible binary signals and the other input thereof simultaneously receives said control signal from the associated comparator circuit, and to provide at each bit storage point a second binary indication when the input thereof from said coding means is the other binary signal and the first input receives said control signal, the storage positions of said storage units thereby receiving binary coded data representing the values of the variables, and switching means for alternating coupling read-out pulses between the inputs of the storage positions of said storage units in the opposite order in which the coding means and comparator circuit outputs are operatively connected to said storage units, whereby storage of data is taking place in one storage unit while the data stored in the other storage unit during the previous scanning cycle is being read out to said common output device.

13. An information handling system comprising, a number of signal sources providing signal outputs whose amplitudes are functions of the values of respective variables, a source of a reference signal which cyclically progressively varies in a definite way, a separate amplitude comparator circuit for each of said signal sources, each comparator circuit including a first and a second input and an output, said first comparator circuit inputs being connected to the outputs of said signal sources and the second inputs thereof being connected in common to the output of said reference signal source, each of said comparator circuits including means for generating a given control signal at the output thereof whenever the signals fed to said inputs thereof reach a given state of comparison, coding means common to all of said comparator circuits and synchronized with said reference voltage source for providing on respective binary code bit output lines multi-bit binary coded signals progressively varying in synchronism with the change in level of the output of said reference signal source, a pair of storage units each having separate storage positions for data on respective variables, each storage position having a number of binary code bit storage points each comprising a magnetic core storage element including a first and a second input winding, means operatively coupling at least some of said comparator circuits respectively to the first input windings of the storage positions of one of the storage units during alternate cycles of said reference signal and operatively coupling at least some of said comparator circuits respectively to the first input windings of the storage positions of the other storage unit during the intervening alternate cycles of said reference signal, means operatively coupling each binary code bit output line of said coding means to the corresponding bit storage point of said storage units in synchronism with and in the same order as the outputs of said comparator circuits are operatively connected to said input windings of said storage positions of said respective storage units, said core storage elements each being driven from a reference state of magnetization to a second state of magnetization when the binary signal fed thereto from said coding means to one of the input windings thereof is a given one of two possible binary signals and the other input winding thereof simultaneously receives said control signal from the associated comparator circuit, the storage positions of said storage units thereby receiving binary coded data representing the values of the variables, and means for alternating coupling read-out pulses between the input windings of the storage positions of said storage units in the opposite order in which the coding means and comparator circuit outputs are switched between said storage units, the read-out pulses driving the cores in said second state of magnetization back to said reference state of magnetization thereby to produce pulses in the output windings thereof, and switching means for alternately coupling the pulse signals generated in said output windings of said respective storage units to a common output device, whereby storage of data is taking place in one storage unit while the data stored in the other storage unit during the previous scanning cycle is being read out to said common output device.

References Cited in the file of this patent

UNITED STATES PATENTS

| | | |
|---|---|---|
| 2,483,140 | Higham | Sept. 27, 1949 |
| 2,677,725 | Schuler | May 4, 1954 |
| 2,734,184 | Rajchman | Feb. 7, 1956 |
| 2,739,285 | Windsor | Mar. 20, 1956 |
| 2,784,396 | Kaiser | Mar. 5, 1957 |
| 2,802,203 | Stuart-Williams | Aug. 6, 1957 |
| 2,825,886 | Pittman et al. | Mar. 4, 1958 |